United States Patent
Bublitz et al.

(10) Patent No.: US 7,679,546 B2
(45) Date of Patent: Mar. 16, 2010

(54) APPARATUS AND METHOD OF DETERMINING LOCATION OF AN OBJECT

(75) Inventors: Scott D. Bublitz, Hartland, WI (US); Jeffrey C. Hessenberger, Neosho, WI (US); John S. Scott, Brookfield, WI (US); Matthew J. Mergener, Germantown, WI (US); David S. Holbrook, Lexington, MA (US)

(73) Assignee: Techtronic Power Tools Technology Limited, Tortola (VG)

(*) Notice: Subject to any disclaimer, the term of this patent is extended or adjusted under 35 U.S.C. 154(b) by 0 days.

(21) Appl. No.: 11/858,413

(22) Filed: Sep. 20, 2007

(65) Prior Publication Data

US 2008/0111732 A1 May 15, 2008

Related U.S. Application Data

(60) Provisional application No. 60/826,358, filed on Sep. 20, 2006.

(51) Int. Cl.
*G01S 13/89* (2006.01)
*G01S 13/88* (2006.01)
*G01V 3/12* (2006.01)
*G01S 13/00* (2006.01)
*G01V 3/00* (2006.01)

(52) U.S. Cl. ............... 342/22; 342/89; 342/90; 342/175; 342/176; 342/179; 342/192; 342/195; 324/323; 324/332; 324/344; 324/600; 324/629; 324/637; 324/642

(58) Field of Classification Search .......... 600/300, 600/407, 425–435; 342/21, 22, 25 R–25 F, 342/52–55, 89, 90, 175, 176, 179, 181, 189–197, 342/27, 28, 82; 324/323, 332–346, 600, 324/629, 637–646; 37/347, 348
See application file for complete search history.

(56) References Cited

U.S. PATENT DOCUMENTS 3,304,434 A  2/1967 Koster (Continued)

FOREIGN PATENT DOCUMENTS

KR  20020085380  11/2002

(Continued)

OTHER PUBLICATIONS

PCT/US2007/079021 International Search Report and Written Opinion dated Feb. 28, 2008.

*Primary Examiner*—Bernarr E Gregory
(74) *Attorney, Agent, or Firm*—Michael Best & Friedrich LLP

(57) ABSTRACT

An apparatus and method of determining location of an object hidden from view. The apparatus includes an imaging tool for detecting hidden objects. The imaging tool includes a housing including a first end and a second end, a display supported by the first end of the housing, and a tracking device supported by the second end of the housing. The imaging tool also includes a transmitter supported by the housing and operable to transmit electromagnetic radiation toward a hidden target, an analysis module supported by the housing and operable to analyze feedback data related to the interaction between the target and the electromagnetic radiation, and an image module operable to receive data from the analysis module to generate an image on the display.

16 Claims, 5 Drawing Sheets

U.S. PATENT DOCUMENTS

| | | | |
|---|---|---|---|
| 3,494,039 A | 2/1970 | Porter | |
| 3,713,156 A | 1/1973 | Pothier | |
| 3,775,765 A * | 11/1973 | Di Piazza et al. | 342/22 |
| 3,967,282 A * | 6/1976 | Young et al. | 342/22 |
| 4,008,469 A * | 2/1977 | Chapman | 342/22 |
| 4,062,010 A * | 12/1977 | Young et al. | 342/21 |
| 4,246,703 A | 1/1981 | Robinet | |
| 4,430,653 A * | 2/1984 | Coon et al. | 342/22 |
| 4,561,183 A | 12/1985 | Shores | |
| 4,677,438 A * | 6/1987 | Michiguchi et al. | 342/22 |
| 4,706,031 A * | 11/1987 | Michiguchi et al. | 324/337 |
| 4,760,647 A | 8/1988 | Gillis | |
| 4,797,544 A | 1/1989 | Montgomery et al. | |
| 4,814,768 A * | 3/1989 | Chang | 342/22 |
| 4,967,484 A | 11/1990 | Nosek | |
| 4,992,741 A | 2/1991 | Douglas et al. | |
| 5,030,956 A * | 7/1991 | Murphy | 342/22 |
| 5,051,748 A * | 9/1991 | Pichot et al. | 342/22 |
| 5,227,797 A * | 7/1993 | Murphy | 342/22 |
| 5,227,799 A * | 7/1993 | Kimura et al. | 342/22 |
| 5,296,807 A | 3/1994 | Kousek et al. | |
| 5,446,461 A * | 8/1995 | Frazier | 342/22 |
| 5,455,590 A | 10/1995 | Collins et al. | |
| 5,457,394 A * | 10/1995 | McEwan | 324/642 |
| 5,477,622 A | 12/1995 | Skalnik | |
| 5,512,834 A | 4/1996 | McEwan | |
| 5,543,799 A | 8/1996 | Heger | |
| 5,560,119 A | 10/1996 | LeBreton | |
| 5,577,330 A | 11/1996 | Cheng | |
| 5,647,135 A | 7/1997 | Fuentes et al. | |
| 5,647,439 A * | 7/1997 | Burdick et al. | 342/22 |
| 5,659,985 A * | 8/1997 | Stump | 37/348 |
| 5,680,048 A * | 10/1997 | Wollny | 342/22 |
| 5,704,142 A * | 1/1998 | Stump | 37/348 |
| 5,760,397 A | 6/1998 | Huguenin et al. | |
| 5,767,679 A * | 6/1998 | Schroder | 324/337 |
| 5,780,846 A | 7/1998 | Angilella et al. | |
| 5,835,053 A * | 11/1998 | Davis | 342/22 |
| 5,835,054 A * | 11/1998 | Warhus et al. | 342/22 |
| 5,900,833 A * | 5/1999 | Sunlin et al. | 342/22 |
| 5,904,210 A * | 5/1999 | Stump et al. | 324/338 |
| 5,905,455 A * | 5/1999 | Heger et al. | 342/22 |
| 6,028,547 A * | 2/2000 | Dory | 342/22 |
| 6,091,354 A * | 7/2000 | Beckner et al. | 342/22 |
| 6,119,376 A * | 9/2000 | Stump | 37/348 |
| 6,182,512 B1 | 2/2001 | Lorraine | |
| 6,195,922 B1 * | 3/2001 | Stump | 37/348 |
| 6,198,271 B1 | 3/2001 | Heger et al. | |
| 6,522,285 B2 * | 2/2003 | Stolarczyk et al. | 342/22 |
| 6,573,855 B1 * | 6/2003 | Hayakawa et al. | 342/22 |
| 6,590,519 B2 * | 7/2003 | Miceli et al. | 342/22 |
| 6,617,996 B2 * | 9/2003 | Johansson et al. | 342/22 |
| 6,633,252 B2 * | 10/2003 | Stolarczyk et al. | 342/22 |
| 6,637,278 B1 | 10/2003 | Fasanella | |
| 6,701,647 B2 * | 3/2004 | Stump | 37/348 |
| 6,778,127 B2 * | 8/2004 | Stolarczyk et al. | 342/22 |
| 6,791,487 B1 | 9/2004 | Singh et al. | |
| 6,791,488 B2 * | 9/2004 | Diekhans et al. | 342/22 |
| 6,909,497 B2 | 6/2005 | Holbrook | |
| 6,952,880 B2 | 10/2005 | Saksa | |
| 7,036,241 B2 | 5/2006 | Williams et al. | |
| 7,113,124 B2 | 9/2006 | Waite | |
| 7,142,193 B2 | 11/2006 | Hayama et al. | |
| 7,173,560 B2 * | 2/2007 | Li et al. | 342/22 |
| 7,262,602 B2 * | 8/2007 | Meyer | 324/337 |
| 7,310,060 B2 * | 12/2007 | Stilwell et al. | 342/22 |
| 7,333,045 B1 * | 2/2008 | Aomori et al. | 342/22 |
| 2002/0170201 A1 | 11/2002 | Trout et al. | |
| 2004/0179578 A1 | 9/2004 | Ben Rached et al. | |
| 2004/0223330 A1 | 11/2004 | Broude et al. | |
| 2005/0179578 A1 | 8/2005 | Healy et al. | |
| 2005/0216032 A1 | 9/2005 | Hayden | |
| 2006/0055584 A1 * | 3/2006 | Waite et al. | 342/22 |
| 2006/0144829 A1 | 7/2006 | Broude et al. | |
| 2006/0170584 A1 | 8/2006 | Romero et al. | |
| 2006/0266742 A1 | 11/2006 | Hall et al. | |

FOREIGN PATENT DOCUMENTS

| | | |
|---|---|---|
| KR | 20030020722 | 3/2003 |
| WO | 2005031502 | 4/2005 |
| WO | WO 2006/088845 | 8/2006 |

* cited by examiner

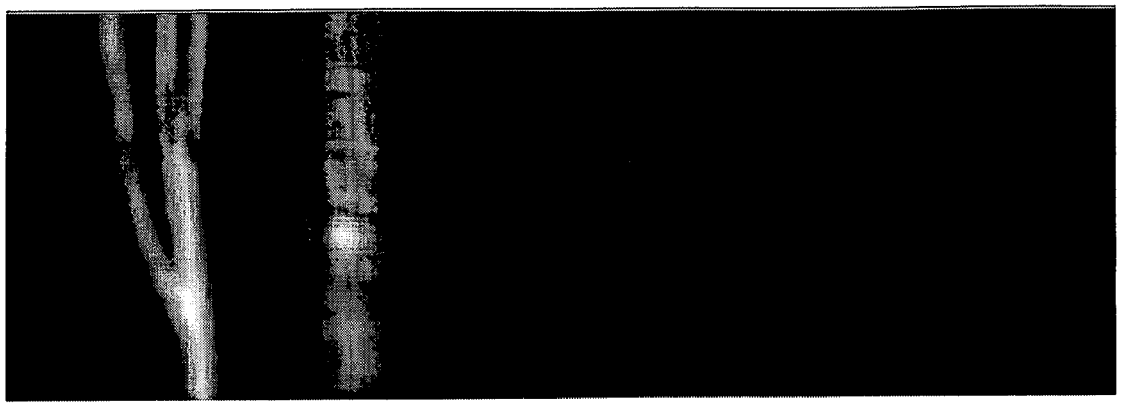
Original Image Produce By Scan
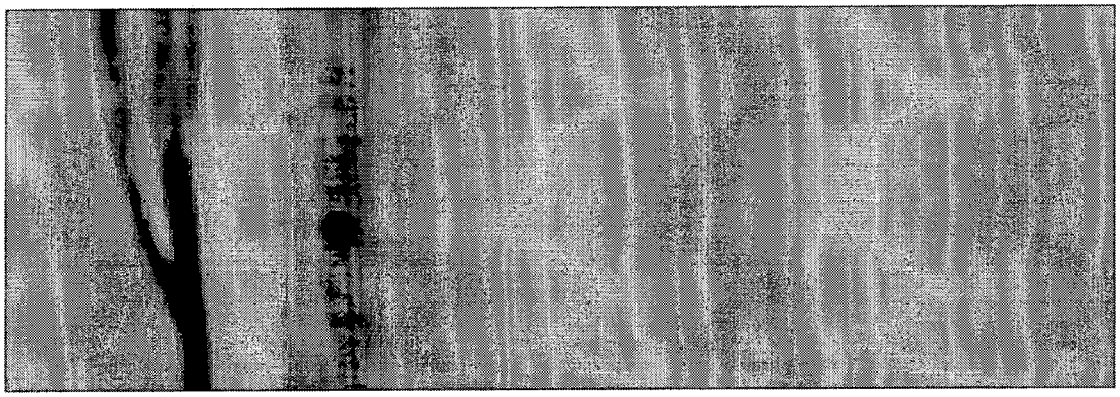
Reversed/Green Backlit Image
FIG. 3

| Image Scale | Beginning Horizontal Scan | Full Horizontal Scan |
|---|---|---|
| 1:1 Scale (Creates direct relationship between image and reality) | 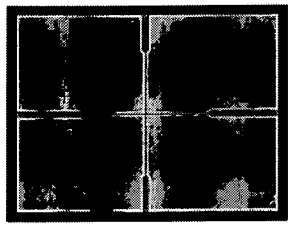 | 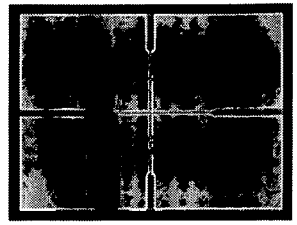 |
| 63.8% Scale (4" scan field fills screen) | 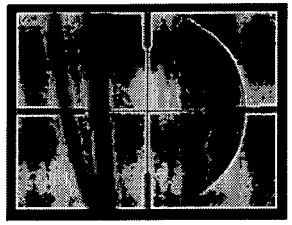 | 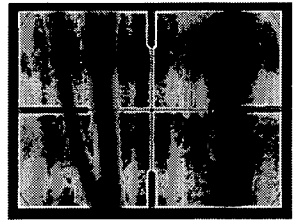 |
| 1:2 Scale (Allows full view of device outline in horizontal plane. 4" scan field leaves space at top and bottom of display for necessary icons) | 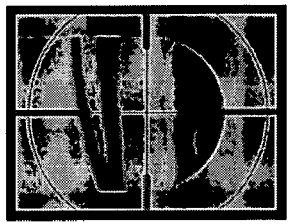 | 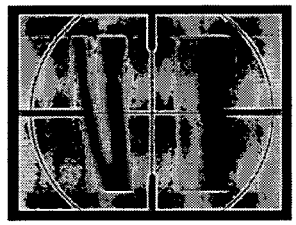 |
| 1:4 Scale (Allows full view of device outline in horizontal and vertical planes. Provides a crisper image than 1:1 or 1:2 scale) | 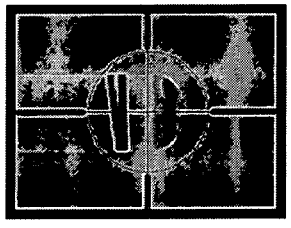 | 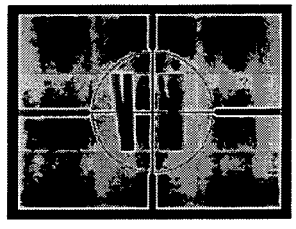 |
| 3:16 Scale (Allows full view of device outline in horizontal and vertical planes. Allows for the viewing of two studs and the space between simultaneously) | 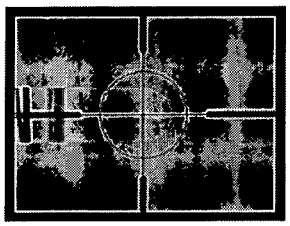 | 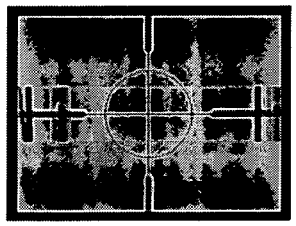 |

\* All screens shown actual scale (320x240 4"Diagonal)

FIG. 4

APPARATUS AND METHOD OF DETERMINING LOCATION OF AN OBJECT

RELATED APPLICATIONS

This application claims priority to U.S. Provisional Patent Application No. 60/826,358, filed Sep. 20, 2006, the entire content of which is incorporated herein by reference.

BACKGROUND

In construction, most building structures include walls, ceilings, and floors that have studs spaced 16" apart (measured from the center of each stud) or about 14.5" apart (measured between the faces of adjacent studs). The depth of a stud in most construction is about 3.5", and the length of a stud can vary as needed or desired. In the U.S. it is common for most walls, ceilings, and floors to employ studs that are 12" or 16" on center. It is also common for most walls to be about 8' to 12' in height, but the walls can be taller as needed or desired.

The spacing of the studs creates volumes or recesses in the walls, ceilings, and floors where objects, such as wires, cables, pipes, electrical outlet boxes, and the like are typically positioned. These objects are usually partially or entirely hidden from view, such as behind drywall, paneling, tiling, or moulding.

As the remodeling and demolition industries have grown, there is a need to be able to see or determine what type of objects are behind the walls, ceilings, and floors and the object's location within the recesses.

BRIEF DESCRIPTION OF THE DRAWINGS

FIG. 3 illustrates images generated by the imaging tool illustrated in FIG. 1.

FIG. 4 illustrates images generated by the imaging tool illustrated in FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In one embodiment, the invention provides a tool for viewing objects hidden from view. For example, the tool is operable to display the objects behind walls, such that the user can determine the type of object and its location.

Figure 1:
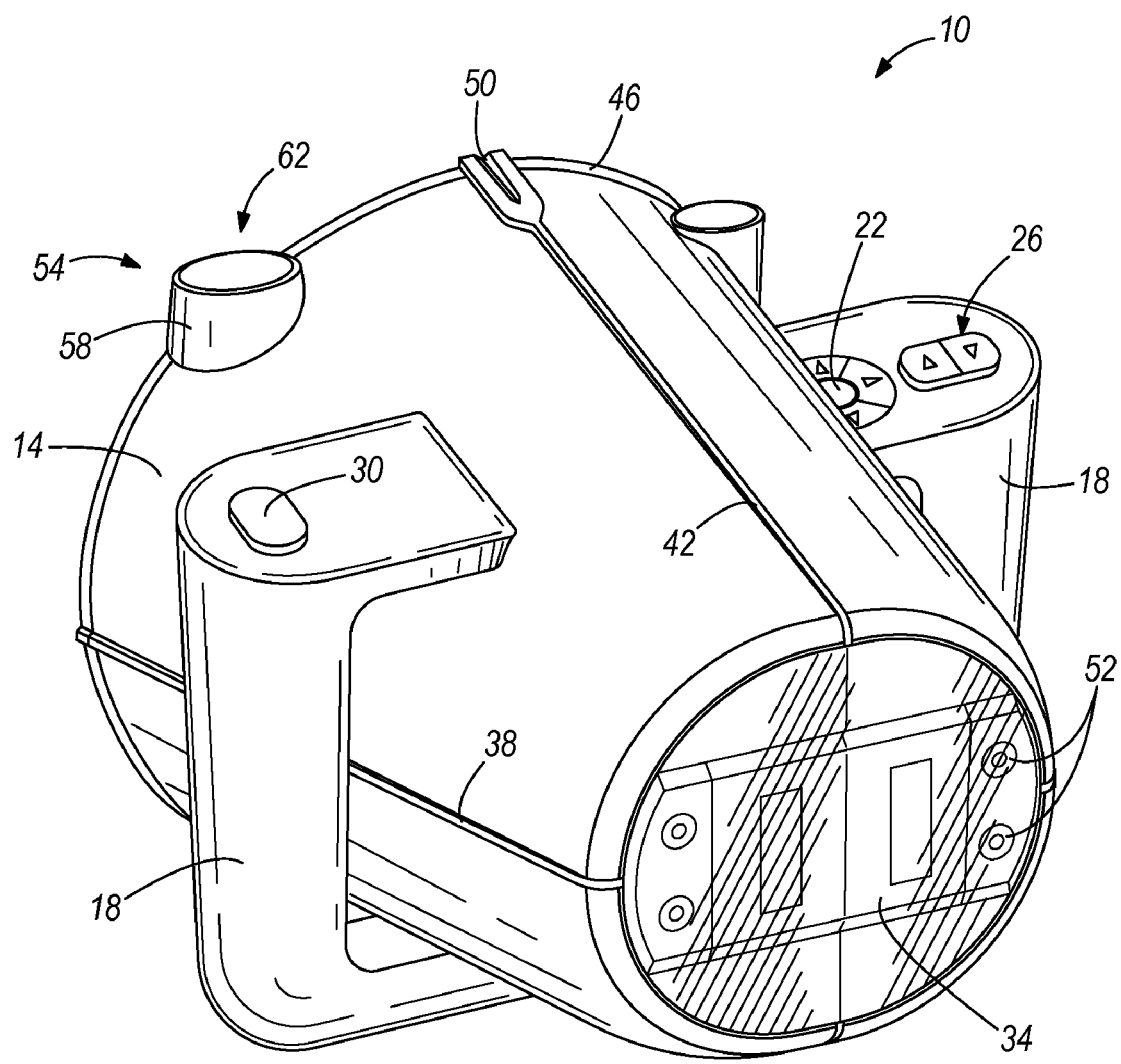
FIG. 1 is a perspective view of an imaging tool according to one embodiment of the present invention.

FIG. 1 illustrates an imaging tool 10 according to one embodiment of the present invention. The imaging tool 10 is operable to detect, but is not limited to, studs, metal or plastic pipes, AC wires, cables, mold, rotting wood, and insect infestation through various types and thicknesses of surfaces, such as, but not limited to, drywall, plaster, ceramic tile, concrete, masonry, and roofing materials. The imaging tool 10 includes a housing 14 having a first end 16 and a second end 46. Although the housing 14 is illustrated as generally frusto-conical shaped in the figures, the housing 14 can have any other suitable shape. The imaging tool 10 also includes one or more handles 18 supported by the housing 14. At least one of the handles 18 can include an actuator 22, such as an actuator or other member operable to control a menu and image pan (discussed below), an actuator 26 operable to adjust scan depth (discussed below), and an actuator 30 operable to initiate a scanning process. The scan actuator 30 is located near the handle 18, within easy reach so the user will not have let go of the imaging tool 10 to activate the scan actuator 30.

The imaging tool 10 also includes a screen or display 34 supported by the housing 14 at the first end 16. The display 34, such as an LCD, is operable to display an image. The display 34 includes a graphic, such as a circle and a crosshair, which remains centered within the display 34. The circle represents the outside shape of the tool 10 at the second end 46 of the housing 14. The second end 46 of the housing 14 can make contact with a surface or wall. The crosshair includes a generally horizontal line 38 and a generally vertical line 42 that both extend onto the housing 14 and toward the second end 46 of the tool 10. The generally horizontal line 38 extends to the left and to the right of the display 34 to the second end 46. The generally vertical line 42 extends above and below the display 34 to the second end 46. A portion of the generally horizontal line 38 and vertical line 42 that extend onto the housing 14 can be raised from the housing surface for further definition of the lines 38, 42.

The housing 14 also includes at least one notch 50 where the vertical line 42 intersects or meets the second end 46 of the housing 14. The notch 50 provides the user with a way to mark the wall (if desired). The notch 50 also allows the user to make the connection between what is on the display 34 and where it located behind the wall.

The display 34 also can include a graphic of a ruler or other measurement tool located on the top, bottom, and/or sides of the display. The ruler can provide the user with a better understanding of the scale and to provide an actual measurement of the size of objects behind the wall. The display 34 also can illustrate depth differences by utilizing colors to represent depth and provide a visual representation of how far an object is from the wall or surface.

The imaging tool 10 also can include one or more additional actuators 52 for selecting various functions, such as imaging modes, scanning speeds, and other operational features of the tool 10.

The imaging tool 10 also includes a tracking device 54 operable to make contact with a surface, such as a wall, ceiling, or floor and be moved around the surface. The tracking device 54 also is operable to maintain an accurate position of the tool 10 on the wall and to accurately generate an image on the display 34 as the tool 10 travels on the surface. The tracking device 54 also can provide distance measurements based on movements of the tool 10. The tool 10 can be positioned near the surface, and it is not required that the tracking device 54 or the tool 10 make contact with the surface.

As illustrated in FIG. 1, the tracking device 54 includes a plurality of wheels 58, such as omni-wheels, and an encoder 62. The encoder 62 can be utilized for detecting and calculating angular travel of the tool 10. In other constructions of the invention, the tracking device 54 can include an optical track ball, such as that used in an optical computer mouse, and/or inertia sensors.

The imaging tool 10 can include a speaker 60 supported by the housing 14. The speaker 60 can produce feedback or audible tones to the user. For example, if the user is scanning too fast, the tool 10 may not be able to process the information as quickly and can provide the user with an audible and/or graphic feedback to tell the user when they are approaching a predetermined scanning rate limit.

Figure 2:
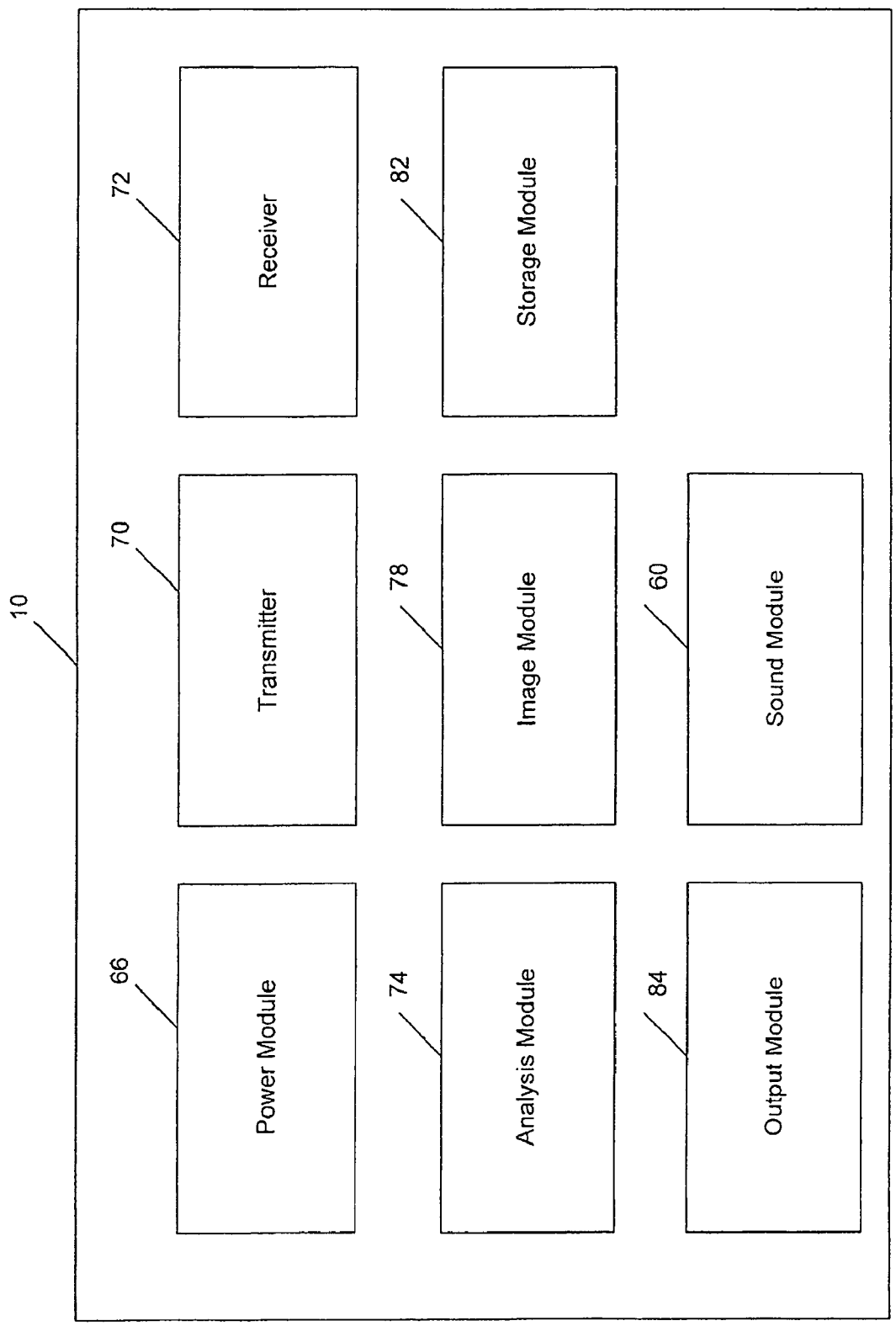
FIG. 2 is a schematic illustration of the imaging tool illustrated in FIG. 1.

FIG. 2 is a schematic illustration of the imaging tool 10. The imaging tool 10 includes a power module 66 operable to provide a power source, e.g., battery, or be connectable to a power source. The imaging tool 10 also includes a transmitter 70 operable to transmit electromagnetic radiation toward a target, i.e., a wall. The transmitter 70 may include a "lens" operable to adjust the scanning depth into the wall. The scanning depth can be adjusted using the actuator 26. The transmitter 70 and/or housing 14 can include additional or other means by which to adjust a distance from the surface to optimize focal position of the beam of the electromagnetic radiation. The adjustment means can be incorporated into the transmitter 70 and/or the housing 14 electronically and/or mechanically. For example, the adjustment means can be incorporated as a sleeve mechanism and/or a motorized mechanism.

In the embodiment illustrated in FIG. 1, the imaging tool 10 utilizes microwaves to "read" through walls and "see" objects behind the walls. Microwaves generally have a frequency in the range of about 300 MHz to about 300 GHz. Microwaves are absorbed by water, fats and sugars. When microwaves are absorbed they are converted directly into heat. Microwaves generally are not absorbed by most plastics, glass or ceramics, and microwaves are reflected by metal.

The imaging tool 10 also includes a receiver 72 operable to detect feedback from the interaction between an object and the microwaves. The receiver 72 transmits the data to an analysis module 74 operable to analyze the feedback data produced by the interaction between the object and the microwaves to detect and locate the object behind the wall. The analysis module 74 provides data to an image module 78 operable to generate an image of the object(s) identified by the analysis module 74. The image module 78 displays the image on the display 34. The image module 78 includes software including an image stitching algorithm to display images of the scanned area and/or target. The software also can employ different calibration, alignment adjustment and noise filtering techniques to improve the image quality. In addition, the software can include an option to select a particular area on the display 34, and the image module 78 can zoom into the selected area for more detailed information.

FIG. 3 illustrates two exemplary images produced by the imaging tool 10. The images in FIG. 3 identify several objects within the field of view of the imaging tool 10. FIG. 4 illustrates images produced by the imaging tool 10 at varying scales. The scale of the generated image can be selected using actuator 22.

The imaging tool 10 also can include a storage module 82 or memory operable to store data and images. The imaging tool 10 can include an output module 84 or various ports that enable the stored data and/or images to be downloaded or transferred to a memory card (e.g., SD, memory stick, etc.) or to a computer via wireless or hardwire connection. The imaging tool 10 can also include the hardware and/or software necessary for the wireless or hardwire communication with a computer or other processor.

Figure 5:
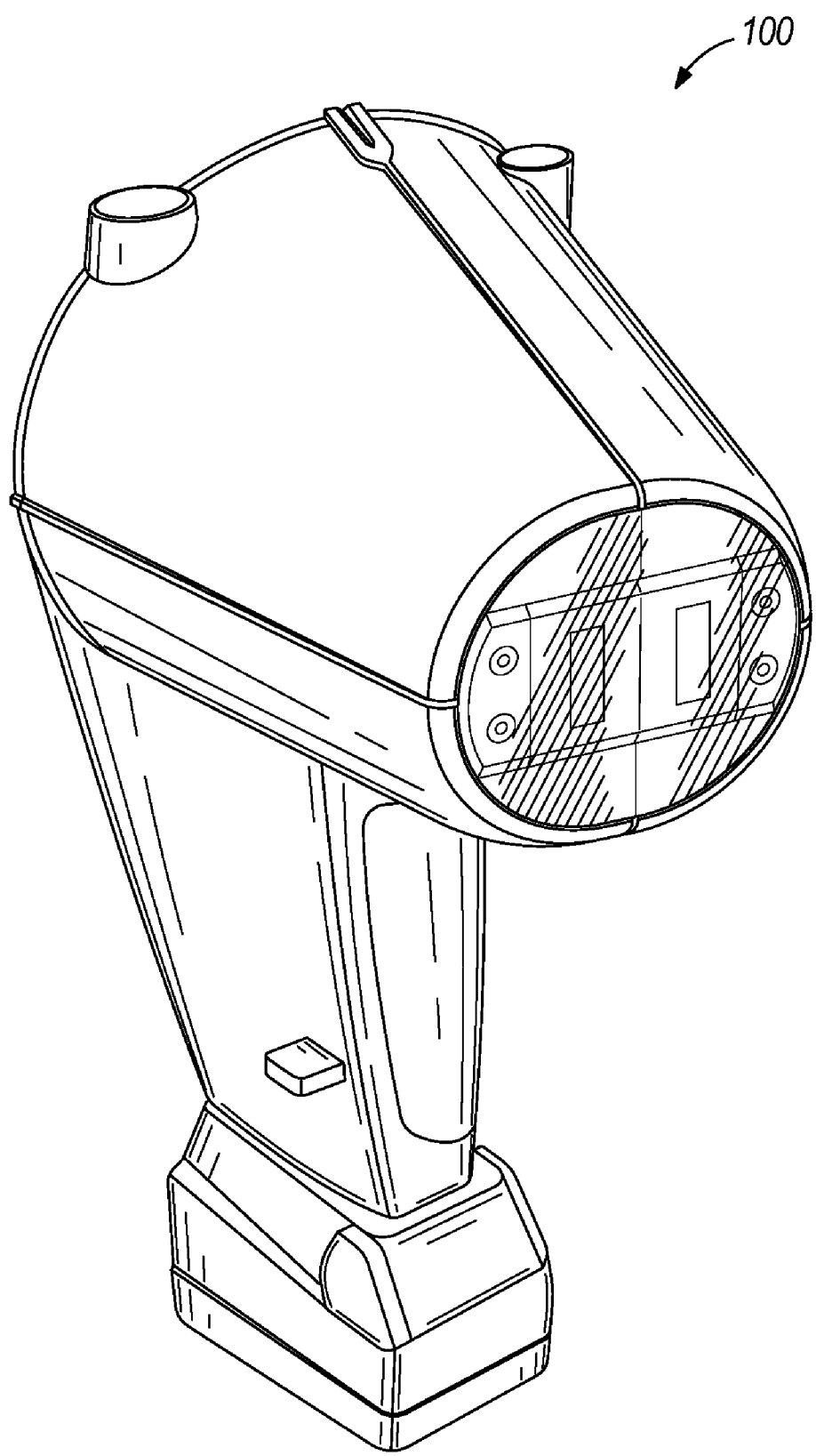
FIG. 5 is a perspective view of an imaging tool according to another embodiment of the present invention.

FIG. 5 illustrates an imaging tool 100 according to another embodiment of the present invention. The imaging tool 100 is similar in structure and function as imaging tool 10 except for the handle configuration. Other suitable handle configurations are envisioned in addition to the two illustrated in the figures.

A method of operation of the imaging tool 10, 100 according to one embodiment of the present invention includes the following acts. A user can initiate operation of the tool 10, 100 by turning on the power. The user positions the tool 10, 100 on the wall or other surface in the area to be scanned. The user activates the scan actuator 30, which transmits microwaves toward the target area. The user then moves the tool 10, 100 on the wall or surface to a desired area. The tool 10, 100 processes and generates an image on the display 34 of the object(s) behind the wall. While the tool 10, 100 is being moved around on the wall, the tracking device 54 maintains an accurate position of the tool 10, 100 on the wall. In addition, the analysis module 74 receives feedback from the interaction between the object(s) and the microwaves and processes the data and transmits the information to the image module 78, which can accurately generate the image of the object(s) on the display 34.

While performing the scanning process, the user can change the scale of the image on the display 34. The user can toggle between several predetermined scales (e.g., 1:1, 1:2, 1:4, and 3:16). The toggle actuator 22 is also within reach of the user's hand. After the user has acquired the desired image, it can be saved to memory inside the tool 10, 100 or to an insertable memory card (SD, Memory Stick, etc.).

While the present invention has now been described and exemplified with some specificity, those skilled in the art will appreciate the various modifications, including variations, additions, and omissions, which may be made in what has been described. Accordingly, it is intended that these modifications also be encompassed by the present invention.

What is claimed is:

1. An imaging tool for detecting hidden objects, the imaging tool comprising:
    a housing including a first end and a second end;
    a display supported by the first end of the housing;
    a tracking device supported by the second end of the housing and operable to measure movements of the imaging tool as the imaging tool moves along a surface;
    a transmitter supported by the housing and operable to transmit electromagnetic radiation toward a hidden target;
    an analysis module supported by the housing and operable to analyze feedback data related to the interaction between the target and the electromagnetic radiation; and
    an image module operable to receive data from the analysis module to generate an image on the display.

2. The imaging tool of claim 1 further comprising a handle coupled to the housing, the handle including an actuator operable to activate the transmitter.

3. The imaging tool of claim 1 wherein the housing is frusto-conical shaped.

4. The imaging tool of claim 1 wherein the tracking device includes a plurality of wheels adapted to glide along the surface.

5. The imaging tool of claim 1 wherein the tracking device includes an omni wheel adapted to glide along the surface.

6. The imaging tool of claim 1 wherein the electromagnetic radiation includes a frequency in a range of about 300 MHz to about 300 GHz.

7. The imaging tool of claim 1 further comprising a speaker supported by the housing and operable to generate sound to a user of the tool.

8. An imaging tool comprising:
a housing including a first end and a second end;
a display supported by the first end of the housing;
a transmitter supported by the housing and operable to transmit microwaves through the second end and toward a hidden target;
an image module operable to generate an image of the hidden target on the display; and
a tracking device supported by the second end of the housing and operable to maintain position data of the imaging tool as the imaging tool moves along a surface.

9. The imaging power tool of claim 8 further comprising an analysis module supported by the housing and operable to analyze feedback data related to the interaction between the hidden target and the microwaves.

10. The imaging power tool of claim 8 wherein the tracking device includes a plurality of wheels adapted to glide along the surface.

11. The imaging power tool of claim 8 wherein the tracking device includes an omni wheel adapted to glide along the surface.

12. The imaging power tool of claim 8 further comprising a handle coupled to the housing, the handle including an actuator operable to activate the transmitter.

13. A method of locating a hidden object, the method comprising:
positioning an imaging tool against a surface;
moving the imaging tool along the surface;
transmitting microwaves toward an object behind the surface;
detecting feedback from the interaction between the microwaves and the object;
generating an image on a display supported by the imaging tool, the image being representative of a size of the object, a depth of the object, and a location of the object; and
tracking, with a tracking device supported by the imaging tool, a position of the imaging tool as the imaging tool moves along the surface.

14. The method of claim 13 further comprising analyzing the feedback to generate the image.

15. The method of claim 13 further comprising adjusting a penetration depth of the microwaves.

16. The method of claim 13 wherein the depth of the object is indicated with color on the display.

* * * * *